(12) United States Patent
Bauza et al.

(10) Patent No.: US 7,815,373 B2
(45) Date of Patent: Oct. 19, 2010

(54) SYMMETRIC SPINDLE DESIGN

(75) Inventors: Marcin B. Bauza, Charlotte, NC (US); Stuart T. Smith, Charlotte, NC (US); Shane C. Woody, Charlotte, NC (US)

(73) Assignee: InsituTec Inc., Concord, NC (US)

( * ) Notice: Subject to any disclaimer, the term of this patent is extended or adjusted under 35 U.S.C. 154(b) by 1283 days.

(21) Appl. No.: 11/106,400

(22) Filed: Apr. 14, 2005

(65) Prior Publication Data

US 2005/0242258 A1    Nov. 3, 2005

Related U.S. Application Data

(60) Provisional application No. 60/563,216, filed on Apr. 19, 2004.

(51) Int. Cl.
*F16C 27/00* (2006.01)
*F16C 23/04* (2006.01)
*F16C 23/08* (2006.01)
*F16C 25/04* (2006.01)

(52) U.S. Cl. .................. 384/215; 384/202; 384/196

(58) Field of Classification Search ............... 384/192, 384/196, 202, 203, 204, 215, 227, 228, 229, 384/230, 231, 245, 246, 247, 248, 249, 261, 384/271
See application file for complete search history.

(56) References Cited

U.S. PATENT DOCUMENTS

| | | | | | |
|---|---|---|---|---|---|
| 1,896,972 | A | * | 2/1933 | Redmond | 310/254 |
| 1,978,484 | A | * | 10/1934 | Auflero | 384/204 |
| 2,769,651 | A | * | 11/1956 | Cain | 403/148 |
| 3,701,912 | A | * | 10/1972 | Schulze et al. | 310/90 |
| 4,471,246 | A | * | 9/1984 | Paillet | 310/42 |
| 4,530,144 | A | * | 7/1985 | Hagelthorn | 29/407.1 |
| 5,484,211 | A | * | 1/1996 | Uthoff | 384/192 |
| 5,494,356 | A | * | 2/1996 | Strobl | 384/204 |
| 5,549,393 | A | * | 8/1996 | Morando | 384/203 |

* cited by examiner

*Primary Examiner*—Thomas R Hannon
*Assistant Examiner*—Justin Krause
(74) *Attorney, Agent, or Firm*—Clements Bernard PLLC; Christopher L. Bernard; Lawrence A. Baratta, Jr.

(57) ABSTRACT

A symmetric ultra-precision spindle design in which all forces of constraint are, within the tolerances of manufacturing and assembly processes, symmetrically arranged about its axis. Additionally this design may require little or no external power other than the forces to rotate the spindle.

10 Claims, 12 Drawing Sheets

SYMMETRIC SPINDLE DESIGN

CROSS-REFERENCE TO RELATED APPLICATIONS

This application claims priority from Ser. No. 60/563,216 filed Apr. 19, 2004, which is incorporated herein by reference.

FIELD OF THE INVENTION

This patent describes a spindle design in which all forces of constraint are, within the tolerances of manufacturing and assembly processes, symmetrically arranged about its axis. Additionally this design is relatively inexpensive to produce and easy to use requiring little or no (in some embodiments) external power other than the forces to rotate the spindle.

DESCRIPTION OF RELATED ART

Over the centuries there have been many designs of spindles to achieve a precision axis of rotation. Currently, those designs considered to be of highest precision are made by constraining a rotary spindle using either hydrostatic bearings or many rolling element bearing designs, typically using angular contact type bearing to achieve the highest precisions. In both cases, there are many examples in the available literature spanning many decades. In the design of this patent we propose the use of a spindle that is constrained using rubbing contact pads with the contacts symmetrically arranged about the spindle axis.

SUMMARY OF THE INVENTION

This invention comprises a solid shaft that is mounted into a solid housing. Attached to either the shaft or housing are at least two solid surfaces that are generated as solids of revolution about an axis or a point (this latter case being a spherical surface). By definition a spindle provides an axis of rotation of one solid body (commonly referred to as the shaft) relative to a second solid body (commonly called the housing). However, in some cases, it may be desirable to fix the inner shaft and rotate the outer housing. Other times the two bodies may both be rotating with different relative angular speeds. In this invention the shaft is contacted with the housing through six contacts arranged symmetrically about the axis of revolution of the spindle. Theoretically, to provide a single freedom of motion only five of the six freedoms of a solid body need to be constrained. This can be achieved by providing five appropriately located rigid contacts as is the case in this invention. The sixth contact is provided for the purpose of both applying the necessary force to ensure that the five contacts do not separate during rotation and also to produce a contact force that is nominally similar to the other contact forces so that the vector sum of all forces between the spindle and housing produce a torsion moment having an axis colinear with the desired axis of the spindle. This sixth contact point is applied to the surface of the solid of revolution with a force that does not change significantly with motion of the contact relative to its point of attachment on either the shaft or housing.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DETAILED DESCRIPTION OF THE INVENTION AND PREFERRED EMBODIMENTS THEREOF

The invention herein in general is a symmetric spindle comprising two solid components connected through at least four bearing contacts. In all designs there will be at least three contacts symmetrically disposed around the axis of rotation of the spindle wherein these contacts are pressed against at least one rotationally symmetric surface that defines the reference for the axis of rotation of said spindle. One of the solids will be rotating relative to the other. It is customary to refer to the solid attached to a reference frame as the stationary housing and the second solid that rotates relative to this as the rotating shaft. The assembled mechanism is referred to as the spindle.

Figure 1:
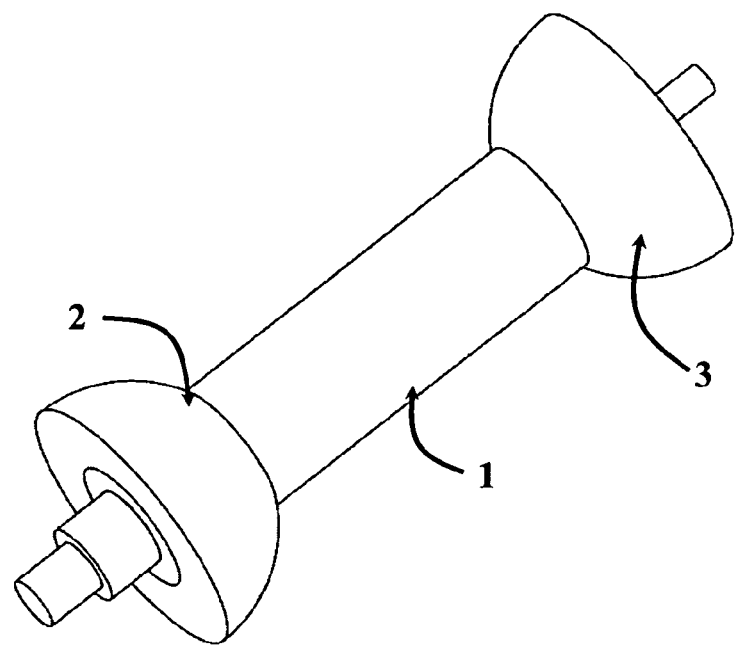
FIG. 1 is a perspective view indicating the major features of a shaft that represents the first embodiment of this invention in which two hemispherical surfaces are attached to a cylindrical shaft with the spherical surfaces facing each other.

To illustrate the assembly and operation of one particular embodiment, consider the shaft shown in FIG. 1. This comprises a solid body made up from a cylinder 1, with the rotationally symmetric surfaces represented by hemispheres 2 and 3 attached on each end. Although not necessary for the purpose of the spindle, in this case, the axis of the cylinder 1 is coincident with the centers of the two spherical surfaces of the hemispheres 2,3. Additionally, in this case, the hemispherical surfaces 2,3 are facing each other along the axis of the shaft cylinder 1.

Figure 2:
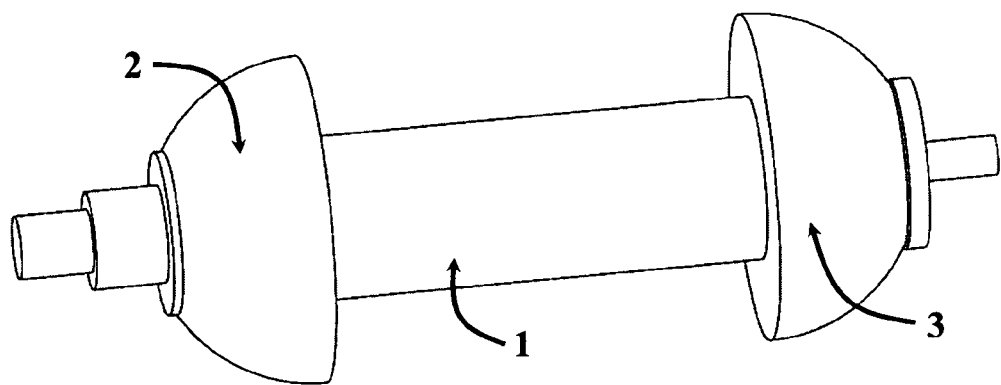
FIG. 2 is a perspective view indicating the major features of a shaft that represents the first embodiment of this invention in which two hemispherical surfaces are attached to a cylindrical shaft with the spherical surfaces facing away from each other.

FIG. 2 shows an alternative embodiment in which the spherical surfaces of the hemispheres, 2 and 3, face outward along the axis of the cylindrical shaft 1.

Figure 3:
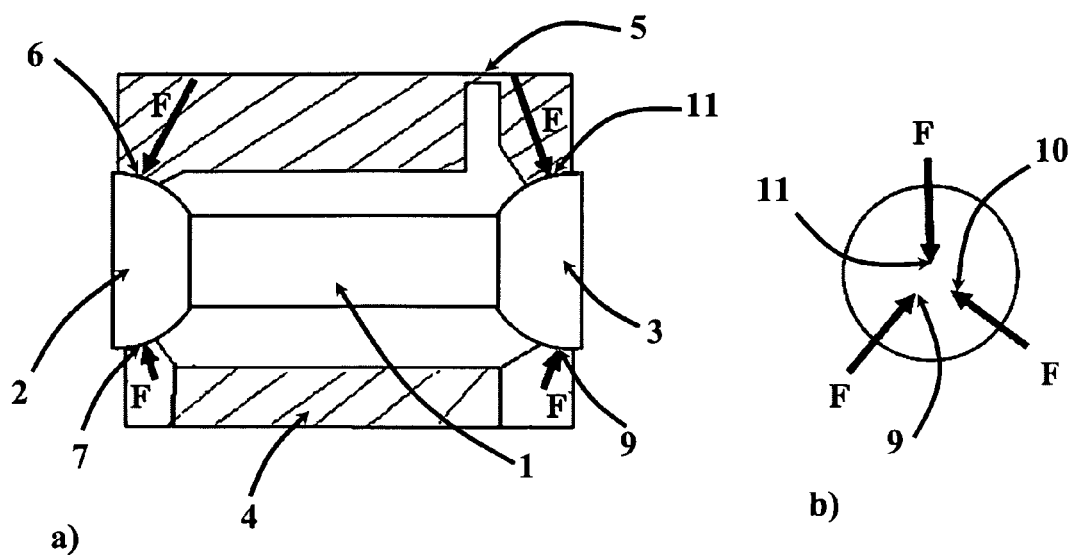
FIG. 3(a) is a schematic diagram to illustrate major features of this invention.
FIG. 3(b) is a side view showing where the forces are applied to the hemisphere

The purpose of the housing in this first embodiment is illustrated by the diagram of FIG. 3(a). In this figure, the shaft is shown in cross section as a cylinder 1 connecting two hemispheres 2,3, at each end. This shaft is mounted into a housing 4 that constrains the shaft via contacts 6, 7, 8 and 9, 10, 11, respectively (FIGS. 3(a), 3(b), 4), on the surface of the hemispheres. In general, it is only necessary that the contacts be on surfaces of revolution about the axis of the spindle. In this particular case, the axis of the spindle will be coincident with a line drawn between the centers of the two hemispheres. Also shown in FIG. 3(b) is a diagram indicating the contact points, 9, 10 and 11 on the spherical surface of the hemisphere 3. To achieve the required performance the sixth contact 11 is mounted through a compliant element 5 (hereafter referred to as a flexure) that has been produced by locally thinning the portion of the housing supporting the contact. It is the purpose of this contact 11 in conjunction with the deformation of the flexure 5 to provide the necessary force to maintain the six contacts. It is also to be pointed out that these contacts are arranged symmetrically about the axis of the spindle so that the forces will all be of similar magnitude and directed in such a manner that the resultant torsion moment due to friction and other common forces will have an axis coincident with that of the spindle.

Figure 4:
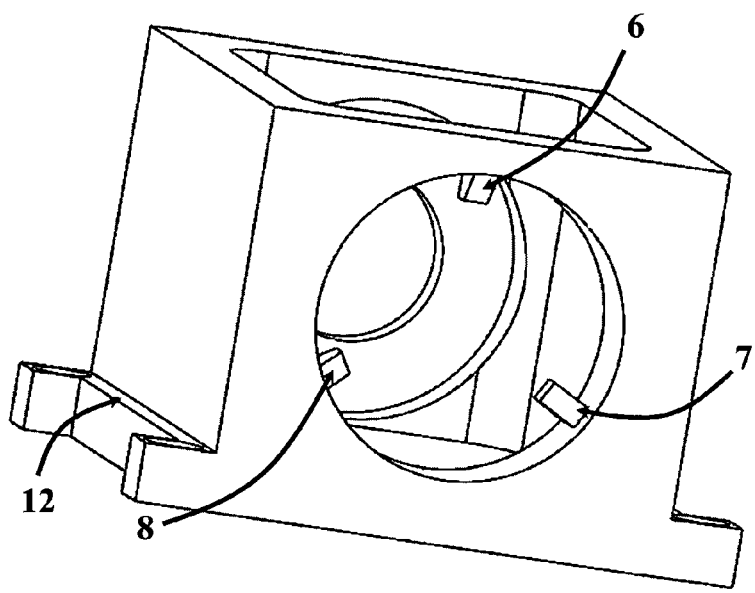
FIG. 4 is an isometric view of a rectangular housing of the invention.

FIG. 4 shows a solid model of one part of a housing for implementing the first embodiment that comprises a hollow rectangular block 12 with three contact points 6, 7, 8 machined into a circular opening at the near end and disposed symmetrically about the center of this circular opening.

Figure 5A:
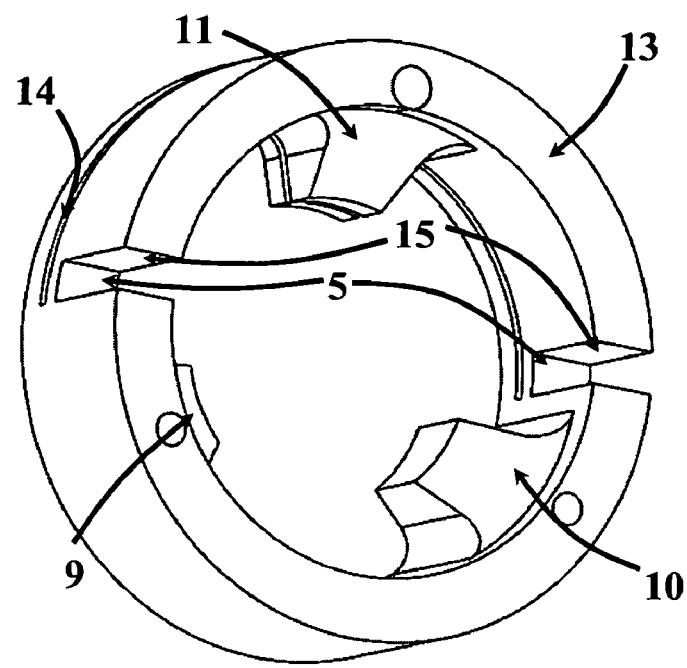
FIG. 5(a) shows a three point contact support mechanism in which one of the contact surfaces is part of a flexure-based spring mechanism.
Figure 5B:
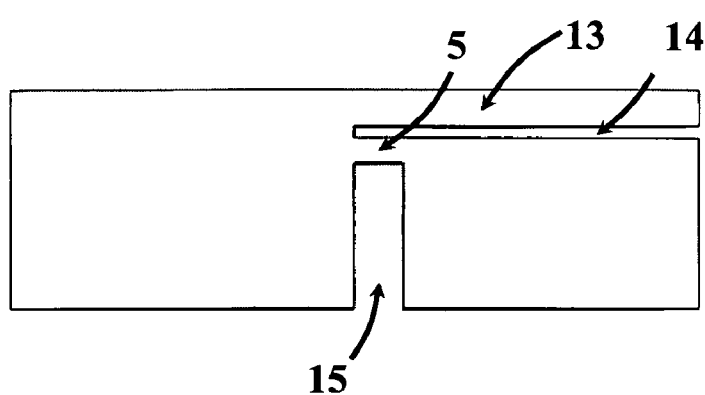
FIG. 5(b) is a side view of FIG. 5(a).

FIG. 5 shows a three contact-point support mechanism 13 that mounts into the opening at the far end of the rectangular block 12 shown in FIG. 4. The three contact points 9, 10, 11 are symmetrically disposed about the axis of this circular component. In addition, two slots, 14 and 15, have been machined into this component leaving a compliant flexure support 5 for the sixth contact 11.

Figure 6A:
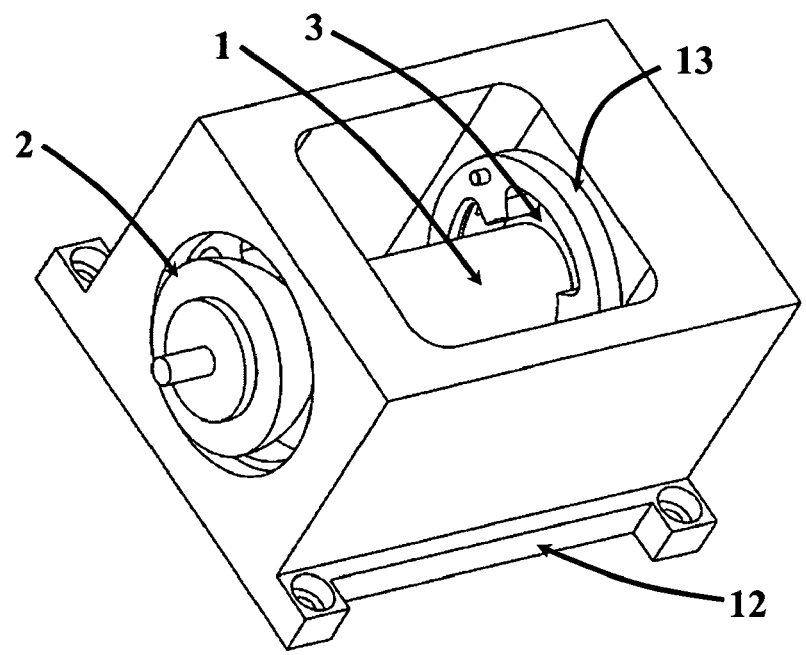
FIG. 6(a) is an isometric view of an assembled spindle.
Figure 6B:
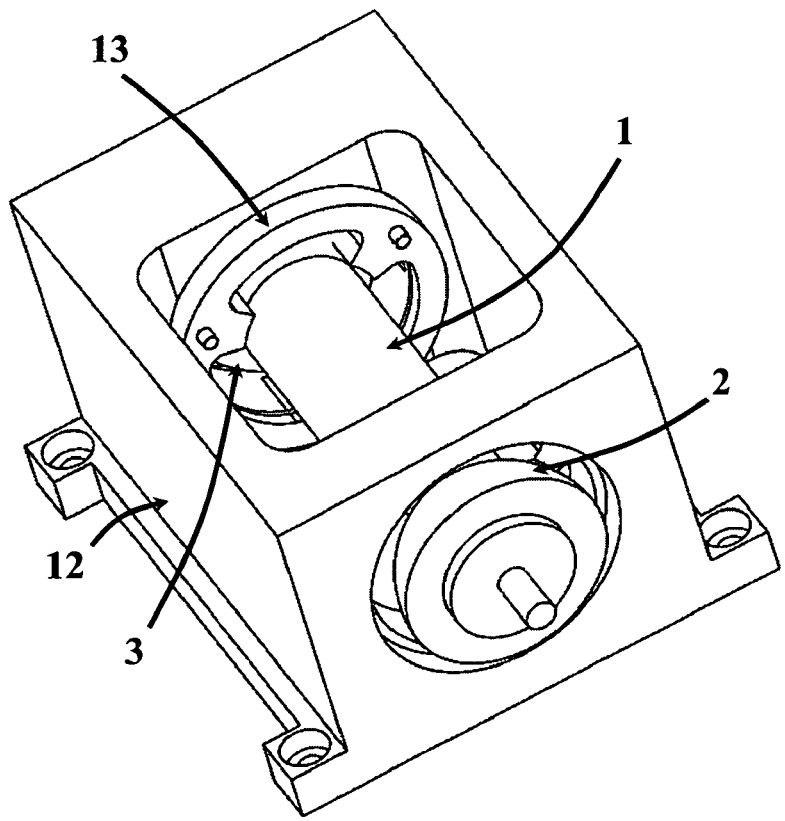
FIG. 6(b) is another view from a different perspective.

FIGS. 6(a) and 6(b) shows two perspective views of the assembled spindle.

Figure 7:
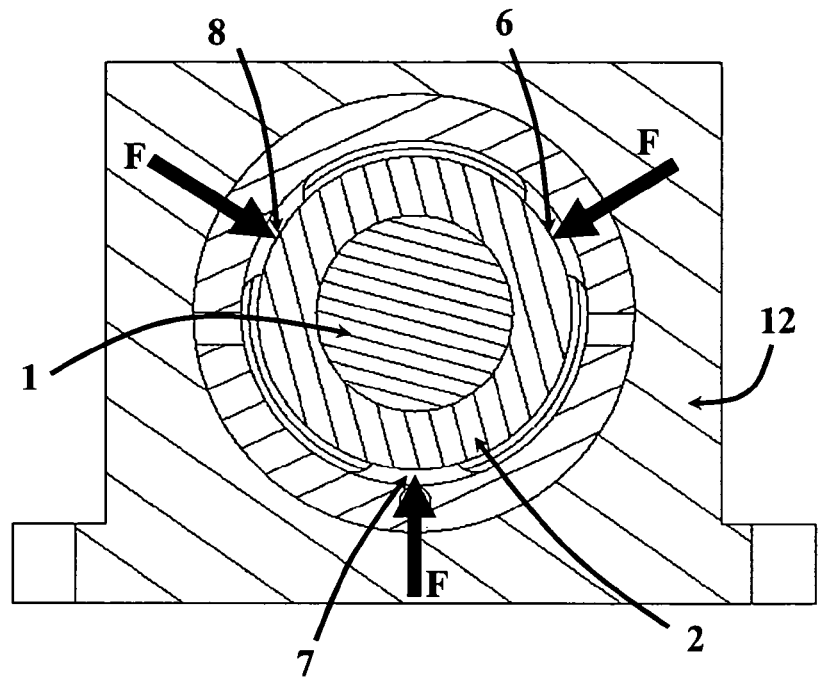
FIG. 7 is a cross sectional view of the spindle in the axial direction showing contacts on the spherical surface and respective contact force vectors.

FIG. 7 shows a cross section through the hemisphere 2 to show the contacts 6, 7, 8.

Figure 8:
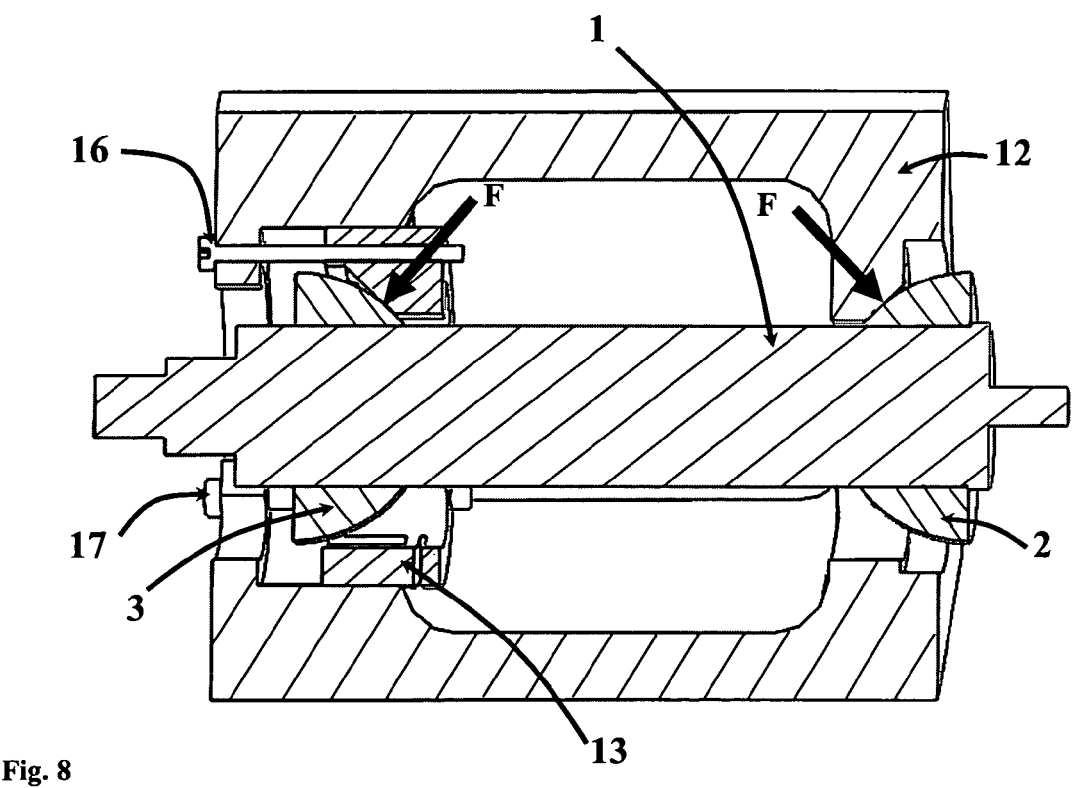
FIG. 8 is a cross sectional view along the axis of the spindle.

FIG. 8 shows a cross section along the axis of the complete assembled spindle. The forces between contacts can be set using the three adjustment screws (two adjustment screws 16, 17 are shown), connected to the three point contact support mechanism 13 and the rectangular block 12.

Figure 9A:
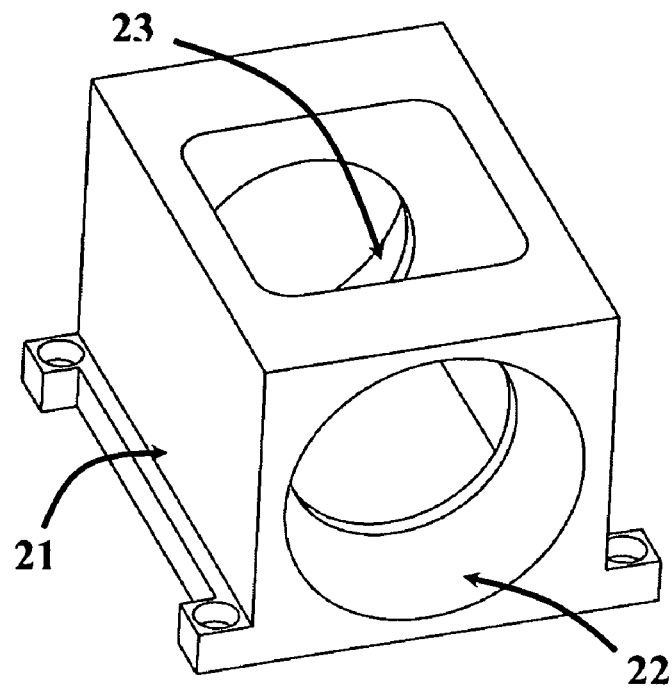
FIG. 9(a) is a perspective view of a housing of a second embodiment.
Figure 9B:
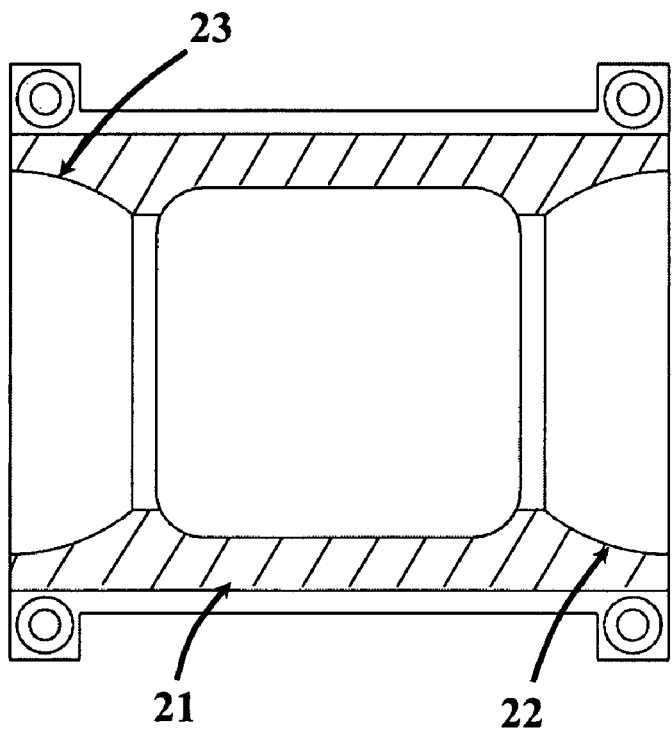
FIG. 9(b) is a cross section along spindle axis.
Figure 10:
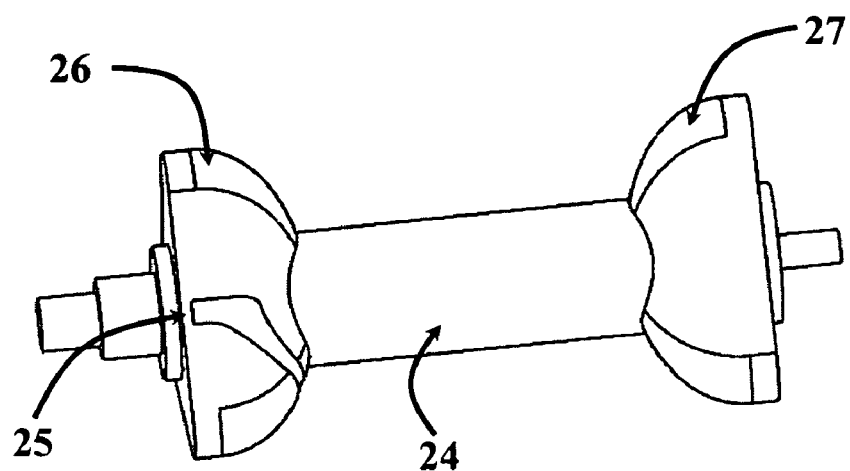
FIG. 10 is a perspective view of a solid model of the shaft for use in the second embodiment.
Figure 11:
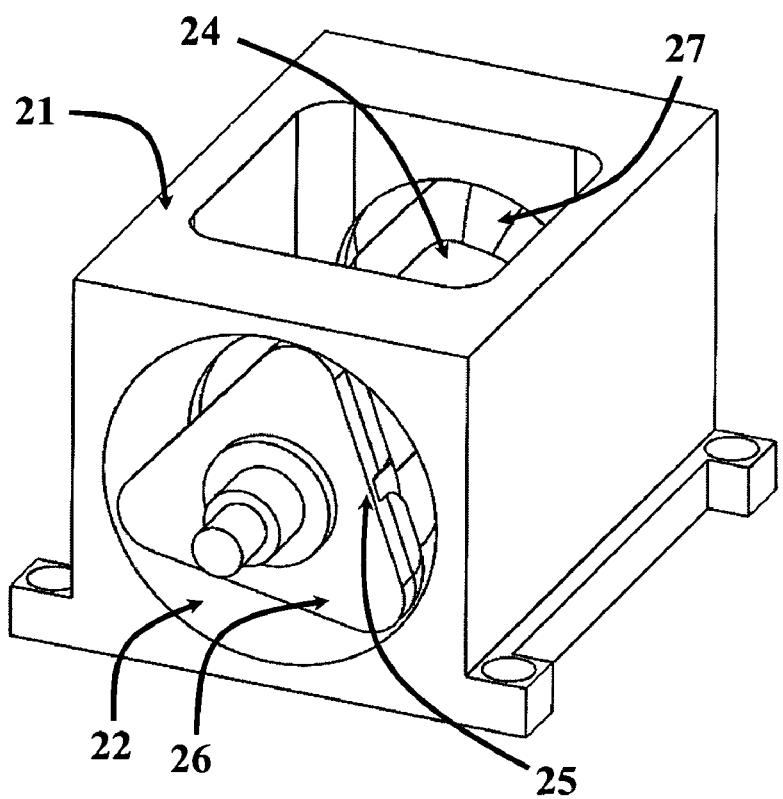
FIG. 11 is a perspective view of a spindle assembly for the second embodiment.

A hollow rectangular block 21 shown in the isometric view of FIG. 9(a) has two spherical surfaces 22 and 23 formed into circular openings at each end. A cross section of this housing that forms the basis of this second embodiment is shown in FIG. 9(b). The shaft of this second embodiment of a spindle is shown in FIG. 10. This is comprised from three components; a cylinder 24 and two, three-point contact blocks 26 and 27 attached at each end. As shown, the contact blocks 26 and 27 comprise a three lobed shape so that, if inserted into a spherical cavity, they will form contacts at three points defining an equilateral triangle. Although not necessary for the purpose of this invention, as shown, the centroid of this triangle will coincide with the axis of the cylinder. A slot has been machined into the contact block 26 so that one of the contacts will be supported through a flexible element 25 that is formed by the thin web of material at the bottom of the slot that will provide the force to maintain contact at the other five locations (FIG. 11).

Figure 12A:
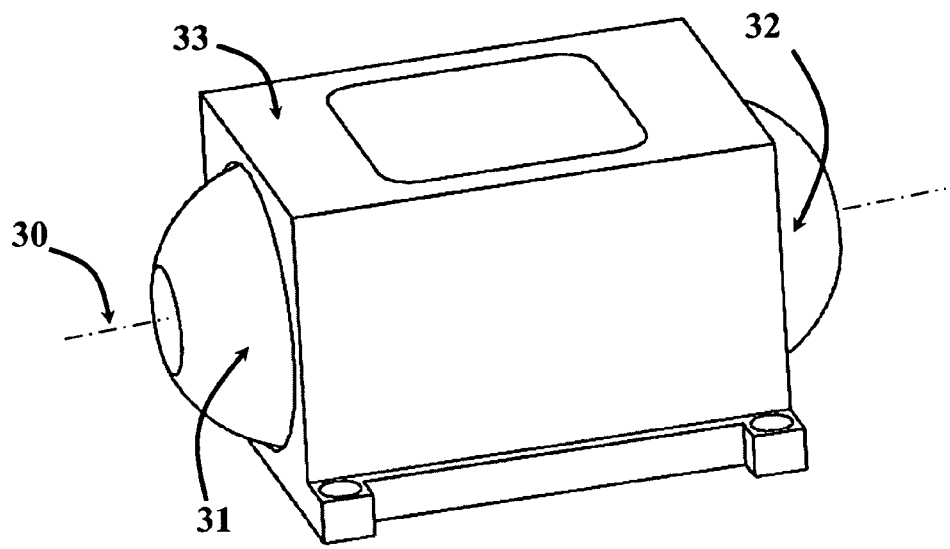
FIG. 12(a) is a perspective view of a housing of a third embodiment and FIG. 12(b) is a cross section along spindle axis.
Figure 12B:
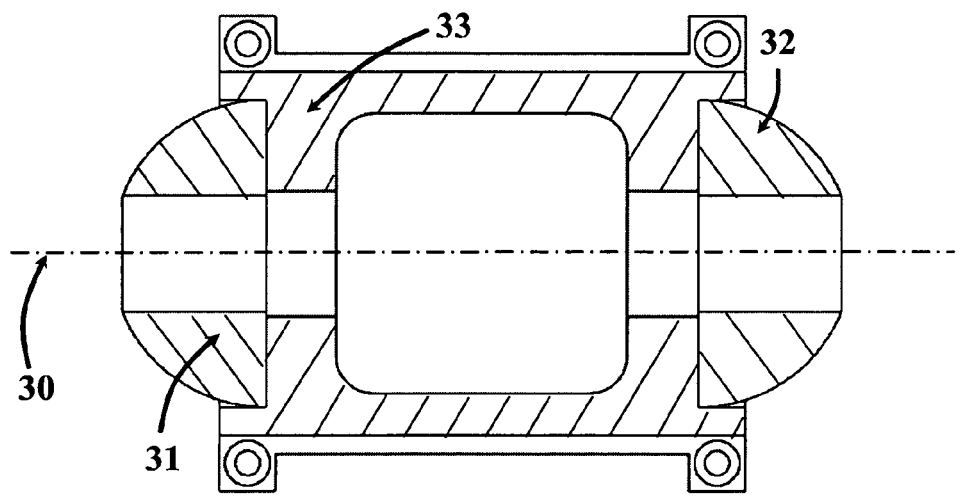
Figure 13A:
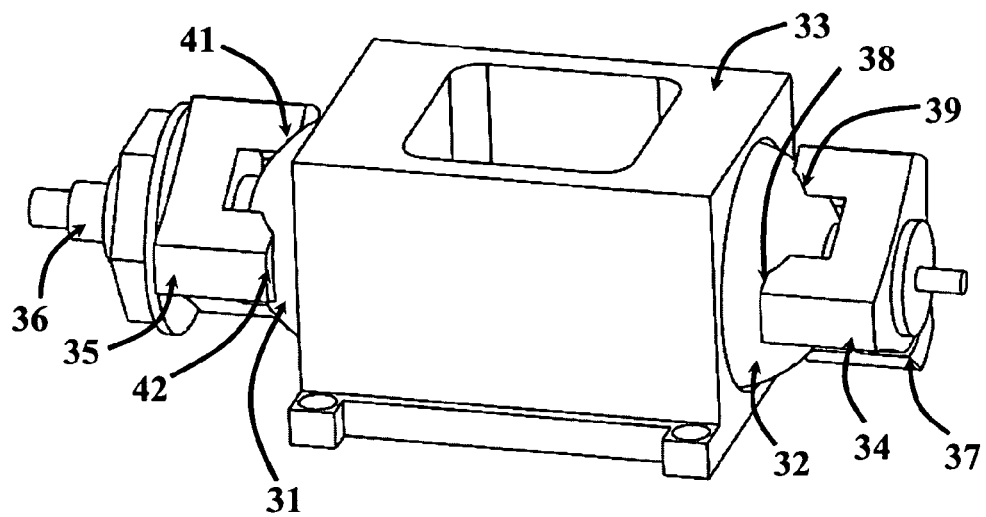
FIG. 13(a) is a perspective view of a spindle assembly for the third embodiment and FIG. 13(b) is a cross section along the spindle axis.
Figure 13B:
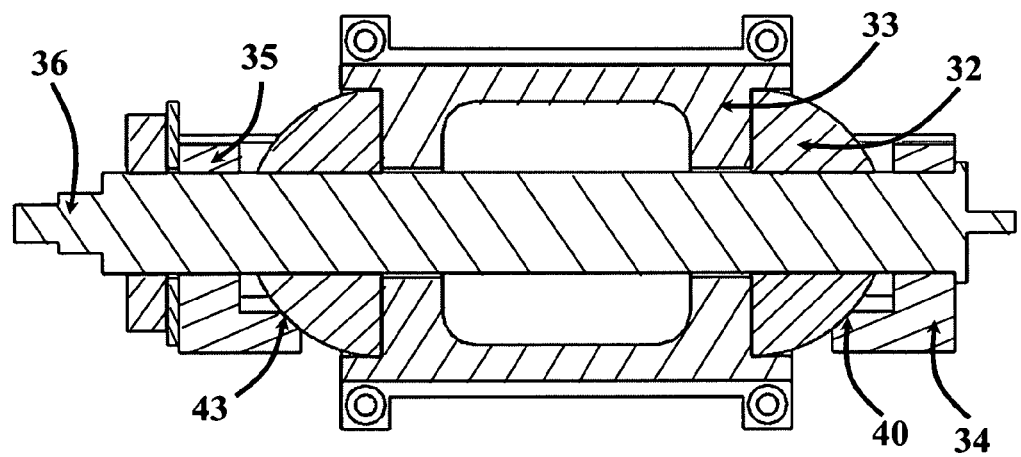

In a third embodiment, as shown in FIG. 12(a), two hemispherical surfaces 31 and 32 with a hole through the major axis 30 have been attached to either end of a rectangular support block 33. A line drawn between the centers of these two spherical surfaces 31,32 will then define the axis of the spindle. A cross section of the housing of FIG. 12(a) is shown in FIG. 12(b). In this embodiment, blocks 34 and 35 each support the three contact points 38, 39, 40, and 41, 42, 43, respectively, are attached to the central cylindrical shaft 36 shown in the spindle assembly in FIGS. 13(a) and 13(b). Again, a slot 37 has been machined into the support of one of the contact points 40 to regulate the forces at each contact.

Figure 14:
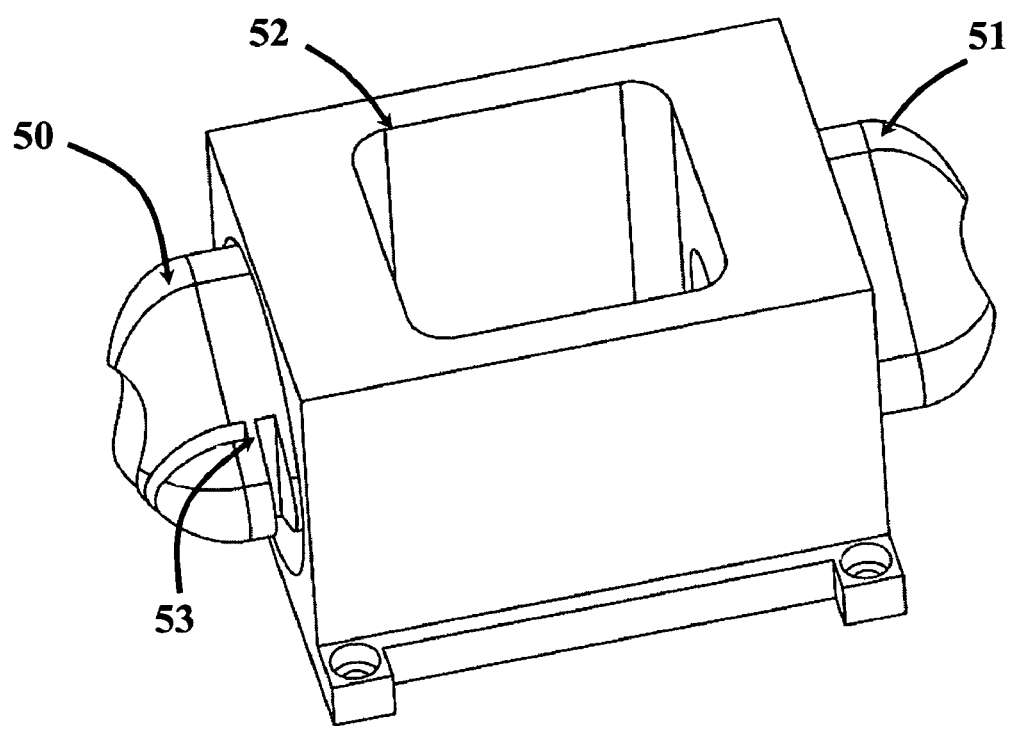
FIG. 14 is a perspective view of a housing of a fourth embodiment.
Figure 15:
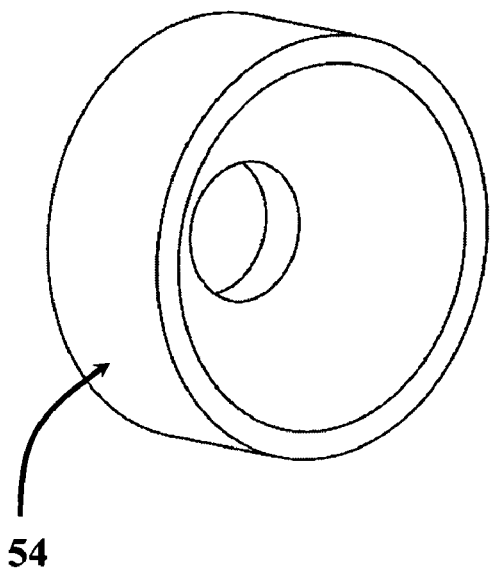
FIG. 15 is a perspective view of hemispherical cups to provide rotation datum surfaces in the fourth embodiment.
Figure 16A:
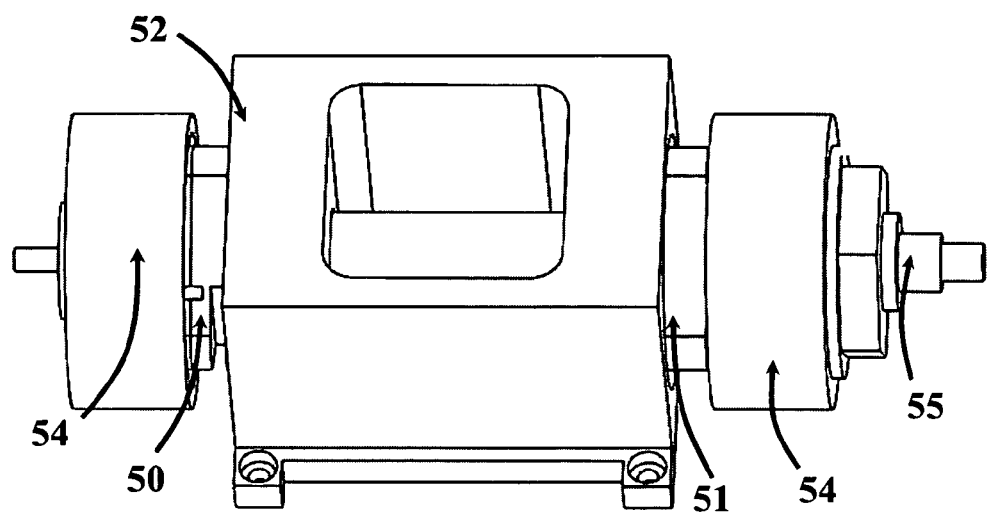
FIG. 16(a) is a perspective view of a spindle assembly for this third embodiment and FIG. 16(b) is a cross section along a spindle axis.
Figure 16B:
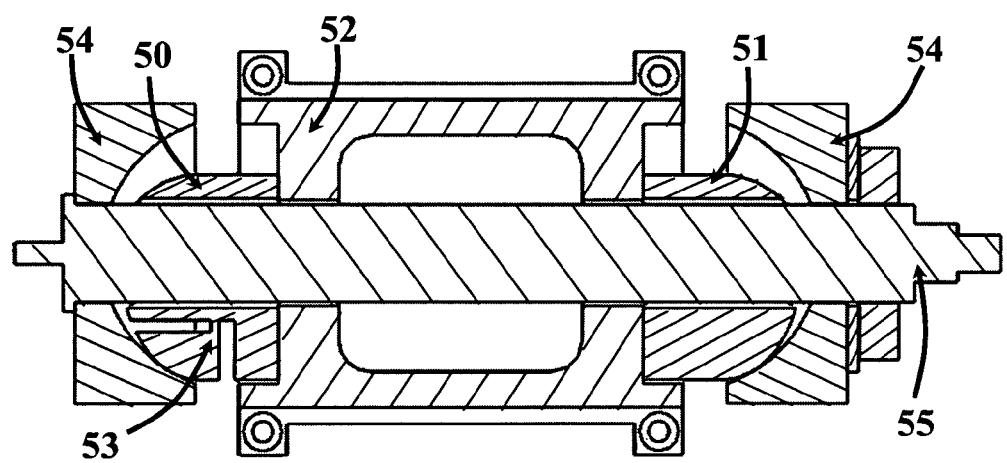

In a fourth embodiment shown in FIG. 14, three-lobed blocks 50 and 51 to each provide three contact points have been attached to either side of a hollow rectangular block 52 to form the spindle housing. Again on one of these three-lobed blocks 50, a slot has been machined to produce a flexure 53 to provide compliance of one of the six contacts. Cups 54 incorporating spherical surfaces (FIG. 15) are then contacted with the prominent three-lobed blocks to form six contact points. Additionally, these two cups 54 are attached to a cylindrical shaft 55 to form the assembled spindle shown in FIGS. 16(a) and 16(b).

Figure 17:
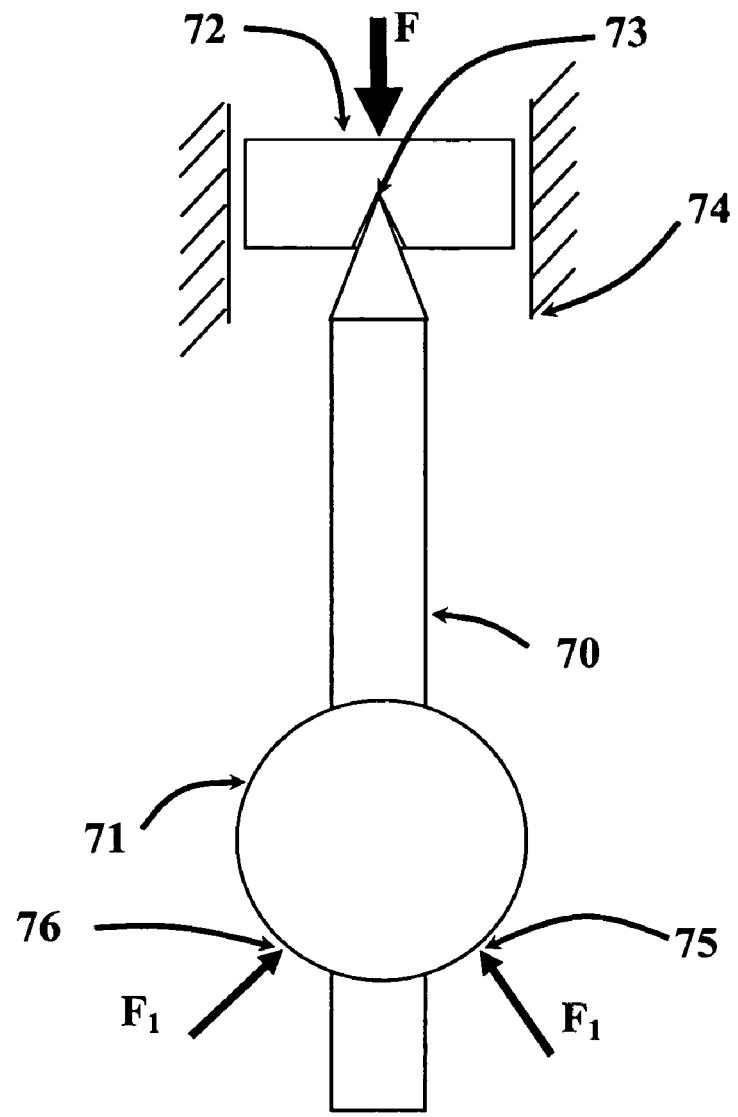
FIG. 17 is a schematic representation of an axially symmetric spindle design utilizing a single contact point at one end and three symmetrically disposed contacts at the other end.

An embodiment that uses four contacts is shown in FIG. 17. In this case, the spindle 70 has a spherical surface 71 at one end and a single point contact 73 at the other end. This single point contact 73 is typically called a jeweled pivot by instrument designers. As with previous embodiments, the sphere is contacted by three bearings, two of which bearings 75, 76 are shown in this figure) spaced symmetrically about the axis of rotation of the spindle 70. The cup 72 of the single point contact at the opposite end from the spherical surface is constrained to move in a vertical direction (as drawn) by a guide mechanism. This guide mechanism could be a slider, flexure or any other suitable mechanism known to those skilled in the art. A force is applied to the cup 72 to maintain contacts. Because of the axial symmetry of the three contacts 75, 76, 77 on the spherical surface, all contacts will be of the same value and orientation. An attribute of this and all of the other designs is that the orientation of the axis of the moving component of the spindle 70 relative to the stationary component of the spindle 70 by adjusting the position of the contacts. As an example, for the embodiment shown in FIG. 17, movement of the single point contact assembly 72, 73, 74 in the plane of the figure will cause the axis of rotation of the spindle 70 to pivot about an axis passing through the center of the sphere 71, with this axis being perpendicular to the plane of the drawing.

Although, all embodiments shown in this section have used a flexure as a compliant mount to provide the contact forces, any other mechanism is considered to produce an equivalent design. Mechanisms that can be used to apply the forces on the contacts include magnetic, electromagnetic, electrostatic, piezoelectric, hydrostatic, a screw thread, any elastic deformations or combinations thereof. In practice, any of these, suitably designed, can be used to provide the necessary forces for this spindle to function. The use of any mechanism for providing the force on the pad does not change the essential features of this invention.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A spindle, comprising:
two solid components forming a kinematic system connected through at least six discrete bearing contacts disposed symmetrically about an axis of rotation of the spindle, wherein three of the six discrete bearing contacts engage a first rotationally symmetric reference surface disposed about the axis of rotation of the spindle and three of the six discrete bearing contacts engage a second rotationally symmetric reference surface disposed about the axis of rotation of the spindle, wherein the first rotationally symmetric reference surface is spaced apart from the second rotationally symmetric reference surface along the axis of rotation of the spindle; and
wherein one or more, but not all, of the six discrete bearing contacts connect to one of the two solid components via a compliant mount to generate a force at the bearing contact to support and maintain the other bearing contacts, and wherein each of the compliant mounts comprises a compliant flexure comprising a locally thinned portion manufactured into one of a housing and a housing insert disposed about the axis of rotation of the spindle.

2. The spindle of claim 1, wherein the first rotationally symmetric reference surface and the second rotationally symmetric reference surface each comprise one of a convex spherical section, a convex conical section, a concave spherical section, a concave conical section, and a counterpart thereof.

3. The spindle of claim 1, wherein one of the two solid components is a moving component and the other of the two solid components is a stationary component.

4. The spindle of claim 3, wherein the first rotationally symmetric reference surface and the second rotationally symmetric reference surface are both one of attached to and integrally formed with the moving component of the spindle, with the six discrete bearing contacts being attached to the stationary component of the spindle.

5. The spindle of claim 3, wherein at least one of the six discrete bearing contacts is adjustable to change the relative position of an axis of rotation of the moving component of the spindle.

6. A spindle, comprising:
two solid components forming a kinematic system connected through at least four discrete bearing contacts disposed relative to an axis of rotation of the spindle, wherein three of the four discrete bearing contacts engage a first rotationally symmetric reference surface disposed about the axis of rotation of the spindle and one of the four discrete bearing contacts engages a second rotationally symmetric reference surface disposed about the axis of rotation of the spindle perpendicular to the axis of rotation of the spindle, wherein the first rotationally symmetric reference surface is spaced apart from the second rotationally symmetric reference surface along the axis of rotation of the spindle; and
wherein one or more, but not all, of the four discrete bearing contacts connect to one of the two solid components via a compliant mount to generate a force at the bearing contact to support and maintain the other bearing contacts, and wherein each of the compliant mounts comprises a compliant flexure comprising a locally thinned portion manufactured into one of a housing and a housing insert disposed about the axis of rotation of the spindle.

7. The spindle of claim 6, wherein the first rotationally symmetric reference surface and the second rotationally symmetric reference surface each comprise one of a convex spherical section, a convex conical section, a concave spherical section, a concave conical section and a counterpart thereof.

8. The spindle of claim 6, wherein one of the two solid components is a moving component and the other of the two solid components is a stationary component.

9. The spindle of claim 8, wherein the first rotationally symmetric reference surface and the second rotationally symmetric reference surface are both one of attached to and integrally formed with the moving component of the spindle, with the four discrete bearing contacts being attached to the stationary component of the spindle.

10. The spindle of claim 8, wherein at least one of the four discrete bearing contacts is adjustable to change the relative position of an axis of rotation of the moving component of the spindle.

* * * * *